(12) United States Patent
Nakamura

(10) Patent No.: US 6,678,066 B1
(45) Date of Patent: Jan. 13, 2004

(54) PRINT CONTROL METHOD AND SYSTEM, AND A RECORDING MEDIUM

(75) Inventor: Kazuo Nakamura, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/281,967

(22) Filed: Mar. 31, 1999

(30) Foreign Application Priority Data

May 6, 1998 (JP) .......................................... 10-123738

(51) Int. Cl.[7] .............................. G06F 15/00; G06K 1/40
(52) U.S. Cl. ...................... 358/1.13; 358/1.13; 358/1.1; 358/1.14; 358/437
(58) Field of Search ................................ 358/1.13, 437, 358/1.1, 1.14

(56) References Cited

U.S. PATENT DOCUMENTS

| | | | | |
|---|---|---|---|---|
| 5,014,221 A | * | 5/1991 | Mogul ........................ 358/1.14 |
| 5,220,674 A | * | 6/1993 | Morgan et al. .............. 709/223 |
| 5,594,653 A | * | 1/1997 | Akiyama et al. ........... 358/1.15 |
| 5,617,518 A | * | 4/1997 | Kuwamoto et al. ......... 358/1.13 |
| 5,636,333 A | * | 6/1997 | Davidson et al. ........... 358/1.15 |
| 5,832,201 A | * | 11/1998 | Hirayama et al. ............. 714/13 |
| 5,832,301 A | * | 11/1998 | Yamaguchi ................. 358/1.13 |
| 5,903,716 A | * | 5/1999 | Kimber et al. .............. 358/1.13 |
| 6,112,256 A | * | 8/2000 | Goffinet et al. ................. 710/8 |
| 6,226,097 B1 | * | 5/2001 | Kimura ...................... 358/1.14 |
| 6,233,568 B1 | * | 5/2001 | Kara .......................... 705/410 |
| 6,246,485 B1 | * | 6/2001 | Brown et al. ............... 358/1.13 |

* cited by examiner

*Primary Examiner*—Edward Coles
*Assistant Examiner*—Ashanti Ghee
(74) *Attorney, Agent, or Firm*—Sughrue Mion, PLLC

(57) ABSTRACT

In a print processing section (12), print commands are converted into the form of a packet, and a header indicative of a print-end position is attached to the packet. The packet with the header attached thereto is stored into a command file section (13). A command transmitting section (14) reads out, whenever occasion calls, the packets (print commands) from the command file section (13), and sends them to a printing device (2). In the event that a print interrupt instruction is input during the printing operation, the command transmitting section (14) takes the following action on the basis of the contents of the headers of the packets. It passes the print commands of other packets than those being currently processed till a print-end position is reached, and sends only the print commands necessary for the process execution to the printing device.

15 Claims, 8 Drawing Sheets

FIG. 7

```
            1 xxxxxxx xxxxxxx   PACKET HEADER    x = 0x0001 ~ 0x7fff
            ···COMMAND···
(1) →       0 xxxxxxx xxxxxxx   PACKET HEADER    x = 0x0001 ~ 0x7fff
            ···COMMAND···
(2) →       1 xxxxxxx xxxxxxx   PACKET HEADER    x = 0x0001 ~ 0x7fff
            ···COMMAND···
 ⋮
            1 xxxxxxx xxxxxxx   PACKET HEADER    x = 0x0001 ~ 0x7fff
            ···COMMAND···
(3) →       00000000 00000000   PACKET ESCAPE HEADER
            00000000 00000011   HEAD OF PAGE END SEQUENCE
            1 xxxxxxx xxxxxxx   PACKET HEADER    x = 0x0001 ~ 0x7fff
            ···COMMAND···
            00000000 00000000   PACKET ESCAPE HEADER
            00000000 00000100   END OF PAGE END SEQUENCE
(4) →       1 xxxxxxx xxxxxxx   PACKET HEADER    x = 0x0001 ~ 0x7fff
            ···COMMAND···
 ⋮
            1 xxxxxxx xxxxxxx   PACKET HEADER    x = 0x0001 ~ 0x7fff
            ···COMMAND···
            00000000 00000000   PACKET ESCAPE HEADER
            00000000 00000011   HEAD OF PAGE END SEQUENCE
            1 xxxxxxx xxxxxxx   PACKET HEADER    x = 0x0001 ~ 0x7fff
            ···COMMAND···
            00000000 00000000   PACKET ESCAPE HEADER
            00000000 00000100   END OF PAGE END SEQUENCE
(5) →       00000000 00000000   PACKET ESCAPE HEADER
            00000000 00000001   HEAD OF JOB END SEQUENCE
            1 xxxxxxx xxxxxxx   PACKET HEADER    x = 0x0001 ~ 0x7fff
            ···COMMAND···
            00000000 00000000   PACKET ESCAPE HEADER
            00000000 00000010   END OF JOB END SEQUENCE
```

PRINT CONTROL METHOD AND SYSTEM, AND A RECORDING MEDIUM

BACKGROUND OF THE INVENTION

1. Field of the Invention

The present invention relates to a technique for concurrently executing a printing process and a print-command sending process, whereby a print control is efficiently performed.

2. Description of the Related Art

A print control system is known which concurrently executes a process for converting image data to be printed (print data) into print commands and a process for sending the print commands to a printing device.

The print control system is schematically shown in FIG. 10. As shown, the print control system is made up of a print management section 31, a print processing section 32 and a command file 33 and a command transmitting section 34. The print management section 31 receives a print request from an application (AP) and issues a print job in response to this. The print processing section 32 generates print data to be printed and converts the print data into print commands formatted so as to be acceptable by a printing device to be used. The command file 33 temporarily stores the print commands. The command transmitting section 34 executes a process for transmitting the print commands, which are stored in the command file 33, to the printing device. The file name of the command file 33 is designated when the processes by the print processing section 32 and the command transmitting section 34 are initialized.

When the print control device 30 performs an actual print control, the print management section 31 sends a print job to the print processing section 32, and the command file name to the command transmitting section 34. Upon receipt of this, the print processing section 32 carries out a process for converting print data into print commands, and stores the print commands into the command file 33 designated. The command transmitting section 34 reads out the print commands from the designated command file name whenever occasion demands, and sends the readout ones to a printing device. The processes by the print processing section 32 and the command transmitting section 34 are carried out concurrently. Therefore, the abilities of the processors are fully utilized. A process speed of the command transmitting section depends on a transmission rate when the data is transmitted to the printing device, and hence is slower than that of the print processing section. For this reason, while one print command is sent to the printing device, the subsequent print command is stored in the command file 33.

The print control device 30, which concurrently executes the processes by the print processing section 32 and the command transmitting section 34, operates at high speed in a normal print mode, but will malfunction when it receives a print interrupt instruction.

When receiving a print interrupt instruction, the print management section 31 sends the reception of the instruction to the processes by the print processing section 32 and the command transmitting section 34. In this case, a print command, not yet sent, is stored in the command file 33 since the process speed of the print processing section 32 is higher than of the command transmitting section 34. If this stored command is sent to the printing device, some time is taken till the printing operation is actually interrupted. If it is not sent, the printing device stops its operation during the printing operation, and a printing paper discharging is abnormal. If the printing paper is stopped before it is completely discharged, the following problem arises when a print command is sent again, it is not normally recognized resulting in a called "trash" printing. A command to forcibly stop the printing device may be sent to the printing device. If the forcibly stopping command is simply applied to the printing device, a called "data-chopping" phenomenon occurs. This hinders the process execution.

SUMMARY OF THE INVENTION

Accordingly, an object of the present invention is to provide an improved print control method which solves the problems that arises when a process for converting print data into a predetermined format of print commands and a process for sending the print commands to a printing device are concurrently executed, to thereby provide an efficient print control.

Another object of the present invention is to provide a print control system suitable for the execution of the control method, and a recording medium used for executing the print control method by a computer.

According to one aspect of the present invention, there is provided a print control method for a device which concurrently executes, by use of a computer, a process for converting print data into a predetermined format of print commands and storing the resultant and another process for sequentially reading out the print commands stored and sending the readout print commands to a printing device, wherein indicating information indicating whether or not the interrupt of the subsequent processing of the print commands is to be permitted or rejected is attached to the print commands converted, and the print control method comprises a process for interpreting the indicating information and determining whether or not the subsequent processing of the print commands is to be interrupted, by the result of interpreting the indicating information before the print commands are sent.

According to another aspect, there is provided a print control method for the above-mentioned device wherein indicating information indicative of a print position is attached to each group consisting of the converted print commands, and the print control method comprises a process for passing print commands till a group with indicating information indicating a specific print position appears, by the indicating information of other groups before the print commands are sent.

According to still another aspect of the invention, there is provided a print control system having print processing means for converting print data into a predetermined format of print commands and storing the resultant and transmission processing means for sequentially reading out the print commands stored and sending the readout print commands to a printing device, wherein the print processing means the transmission processing means concurrently operate, the improvement being characterized in that the print processing means includes means for attaching indicating information indicating whether or not the interrupt of the subsequent processing of the print commands is to be permitted or rejected to the print commands converted, and the transmission processing means includes means for interpreting the indicating information and determining whether or not the subsequent processing of the print commands is to be interrupted, by the result of interpreting the indicating information before the print commands are sent.

According to the present invention, there is another print control system in which the print processing means includes means for attaching indicating information indicative of a print position to each group consisting of the converted print commands, and the transmission processing means includes means for passing print commands till a group with indicating information indicating a specific print position appears, by the indicating information of each group before the print commands are sent.

A recording medium of the invention is a recording medium, accessible by a computer, which stores a program for causing the computer to execute the following processes:

(1-1) a process for converting print data into a predetermined format of print commands and storing the resultant, (1-2) a process for attaching indicating information indicating whether or not the interrupt of the subsequent processing of the print commands is to be permitted or rejected to the converted print commands, and storing the resultant, (1-3) a process for interpreting the indicating information stored to determine whether or not the interrupt of the subsequent processing of the print commands is to be permitted or rejected, and (1-4) a process for sending only the print commands determined to be sent by the contents of the indicating information to a printing device.

Another recording medium of the invention is a recording medium, accessible by a computer, which stores a program for causing the computer to execute the following processes:

(2-1) a process for converting print data into a predetermined format of print commands, (2-2) a process for gathering the converted print commands into groups, (2-3) a process for attaching indicating information indicative of a print position to each group and storing the resultant, (2-4) a process for passing print commands till a group with indicating information indicating a specific print position appears, by the indicating information of each group stored, and (2-5) a process for sending predetermined print commands to a printing device when a group with indicating information indicating a specific print position appears.

The identifying information is preferably information formatted so as not to be recognized by the printing device, and deleted before the print commands are sent to the printing device.

BRIEF DESCRIPTION OF THE DRAWINGS

FIG. 7 is a diagram showing the details of the contents of a process executed by the print control system;

DESCRIPTION OF THE PREFERRED EMBODIMENTS

Figure 1:
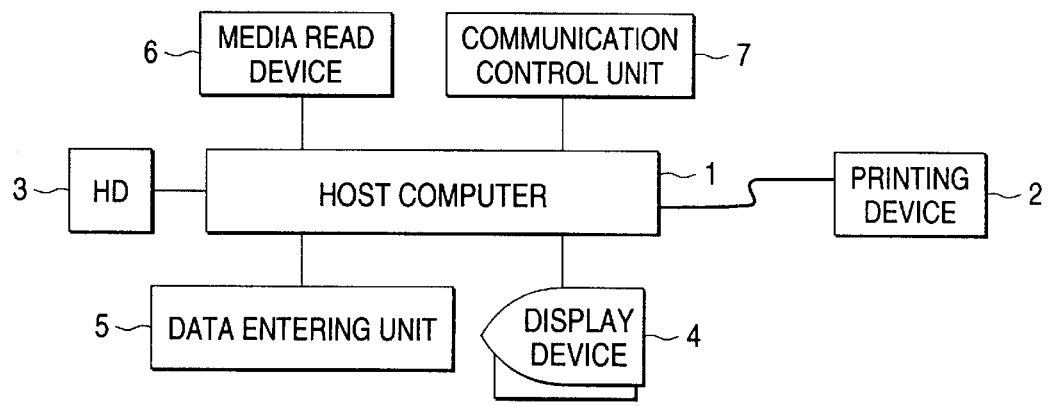
FIG. 1 is a block diagram showing an arrangement of a print system to which the present invention is applied.

The preferred embodiments of the present invention will be described in detail with reference to the accompanying drawings. An example of a printing system to which the present is incorporated is typically shown in FIG. 1. In the printing system, a host computer 1 and a printing device 2 are interconnected by a cable. The printing device 2 receives data to be printed (print data) and format information associated therewith from the host computer I from the host computer 1, and executes a given print process to form an image on a printing paper. The printing device 2 may take any of a serial printer, a page printer, a Xerography-basis printer and others. The printing device 2 may be connected to the host computer 1 in a stand-alone mode or a network mode.

The host computer 1 executes programs, controls and monitors the program execution under control of a system program. More precisely, the host computer 1 includes a CPU (central processing unit), a RAM (random access memory), a ROM (read only memory), which are mounted on a system board (not shown), and a hard disc (HD) 3 contained therein or externally connected thereto. The CPU reads a necessary program from the HD 3, and executes a required process in accordance with the readout program. The HD 3 stores an application program (AP) for generating print data and format information, a print control data for constructing the print control system by use of a single device, and others. In the specification, the print control system constructed with a single device will be called a print control device.

The host computer 1 is additionally connected to a display device 4 with a monitor screen, a data entering unit 5 for entering various kinds of setting information, a media read device 6 including a CD-ROM drive and a FDD, a communication control unit 7 serving as an interface with a local area network. The display device 4 displays dialogue windows on the screen in response to instructions by the system program, AP, the print programs or others. The data entering unit 5 includes a keyboard and a pointing device, e.g., a mouse.

The print control program, usually supplied from a manufacturer who manufactured the printing device 2, and is marketed in a stated that it is stored in a flexible disc (FD) or a CD-ROM in such a format as to allow host computer 1 to make an access to the stored program. Before the printing device 2 is used, the print control program is installed to the host computer 1. To this end, the host computer 1 reads the print control program from the disc by use of the media read device 6 or from the manufacturer or the program supplier by use of the communication control unit 7.

A print control device, which is constructed with the print control program acquired by the host computer 1, will be described.

Figure 2:
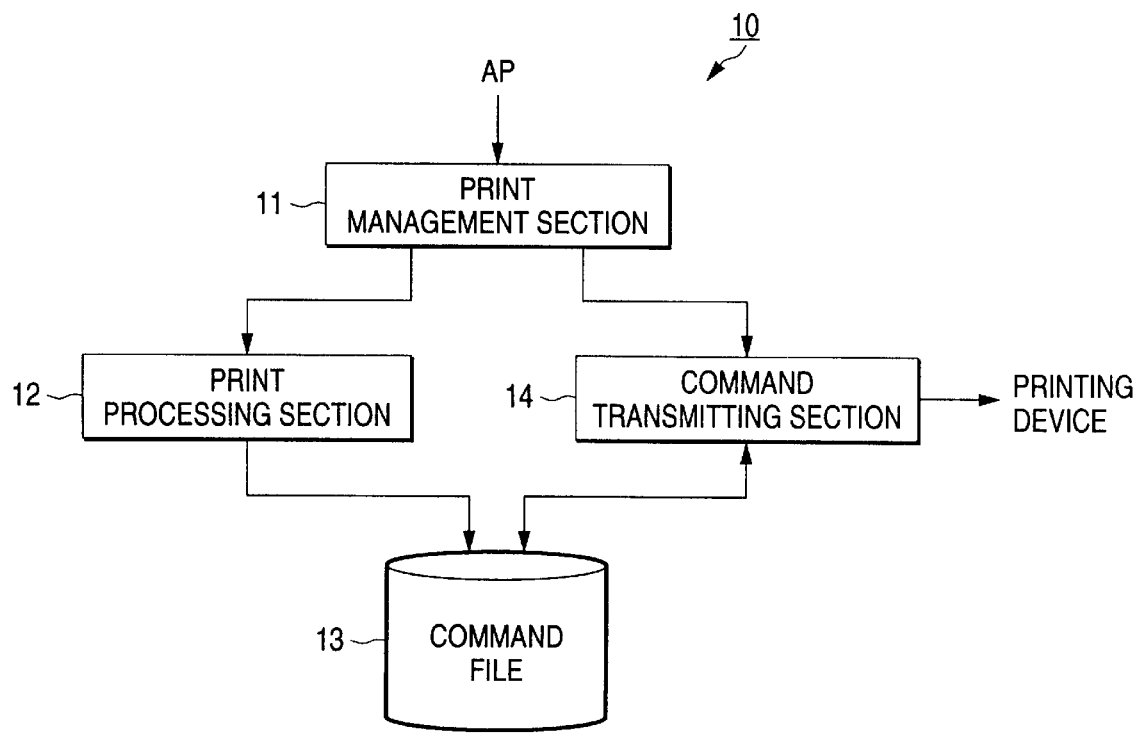
FIG. 2 is a block diagram showing an arrangement of a print control device which is an embodiment of the invention.

The print control device, designated by reference numeral 10, includes the functions of a print management section 11, a print processing section 12, a command file section 13 and a command transmitting section 14, as functionally shown in FIG. 2. Processes by the print processing section 12 and the command transmitting section 14 are concurrently carried out. The print management section 11 and the command file section 13, respectively, have the same functions as of the print management section 31 and the command file section 33 in the conventional print control device 30.

The print management section 12 converts print commands for a print job every several bytes into the form of a packet, and attaches headers as indicating information to the packet, and stores the resultant into the command file section 13. The indicating information may be information indicating that the succeeding data or packet is present when the current processing is the processing of the type in which an interruption during its execution should be avoided, such as the processing of image data, or information indicating printed positions, such as the start and end of a stream of commands, a page and a job.

The code preferably used for the indicating information is a code which can be recognized by the command transmitting section 14 and the printing device 2 but are not processed in the printing device 2. An example of such a code is the ESC-X code. The reason for this follows. As will be described later, the header is deleted before a print command group is sent to the printing device 2. Where the print control device is used connecting the host computer 1 to the network, the header removing function does not operate where some type of connection mode is used. In this case, the printing device 2 frequently fails to correctly recognize the print command group. To avoid this, the above-type of code is used for the indicating information.

For the storage of the print commands, the print control device may contain a function to detect the remaining memory capacity of the memory region used for forming the command file section 13 before a print process commences. When the function detects that the left memory capacity is less than a predetermined one, the print commands may directly be sent to the command transmitting section 14 without forming command file section 13.

The command transmitting section 14 has a function to interpret the header (indicating information) before it sends the print commands to the printing device 9, and performs a predetermined process in accordance with the interpretation result. If the interpretation result indicates the interrupt of the subsequent processing of the print commands is rejected, the processing of the subsequent process is continued till a header indicating that the interrupt of the subsequent processing is permitted comes in, even if a print interrupt command is input. The use of this function eliminates the called "data chopping" phenomenon.

The command transmitting section 14 may be arranged such that it waits for a packet with the header indicative of a specific print position, while passing other packets, and sends the corresponding print commands to the printing device. Specifically, the command transmitting section 14 passes a sequence start position till a packet with the header indicative of a sequence end position of each page or job, comes in. When receiving that packet, the command transmitting section 14 sends a print end command to the printing device 2. This arrangement effectively eliminates the abnormal paper discharging and the "trash" printing. Incidentally, when sending print commands, the command transmitting section 14 deletes the headers of the command packets.

A print control method by the thus constructed print control device 10 will be described. In the method description, the headers of the packets are: 1) a continuous packet header indicative of a continuous processing of print image, viz., the rejection of the interrupt of the subsequent processing of the print commands, 2) a pause packet header indicative of a pause placed every print image (viz., permission of the interrupt of the subsequent processing), 3) a job-start escape packet header indicative of a job start position, 4) a page-start escape packet header indicative of a page start position, 5) a page-end escape packet header indicative of a page end position, and 6) a job-end escape packet header indicative of a job end position.

In this specification, a packet with a continuous packet header attached thereto is named a continuous packet; a packet with a pause packet header attached thereto, a pause packet; a packet with a page-start escape header, a page start packet; a packet with a page-end escape header, a page end packet; a packet with a job-start escape header, a job start packet; and a packet with a job-end escape header, a job end packet. Further, the packet header of which the contents are ignored is named simply a packet header. The print data forming each packet is designated as a command stream, and data other than the print data, as a command group.

Figure 3:
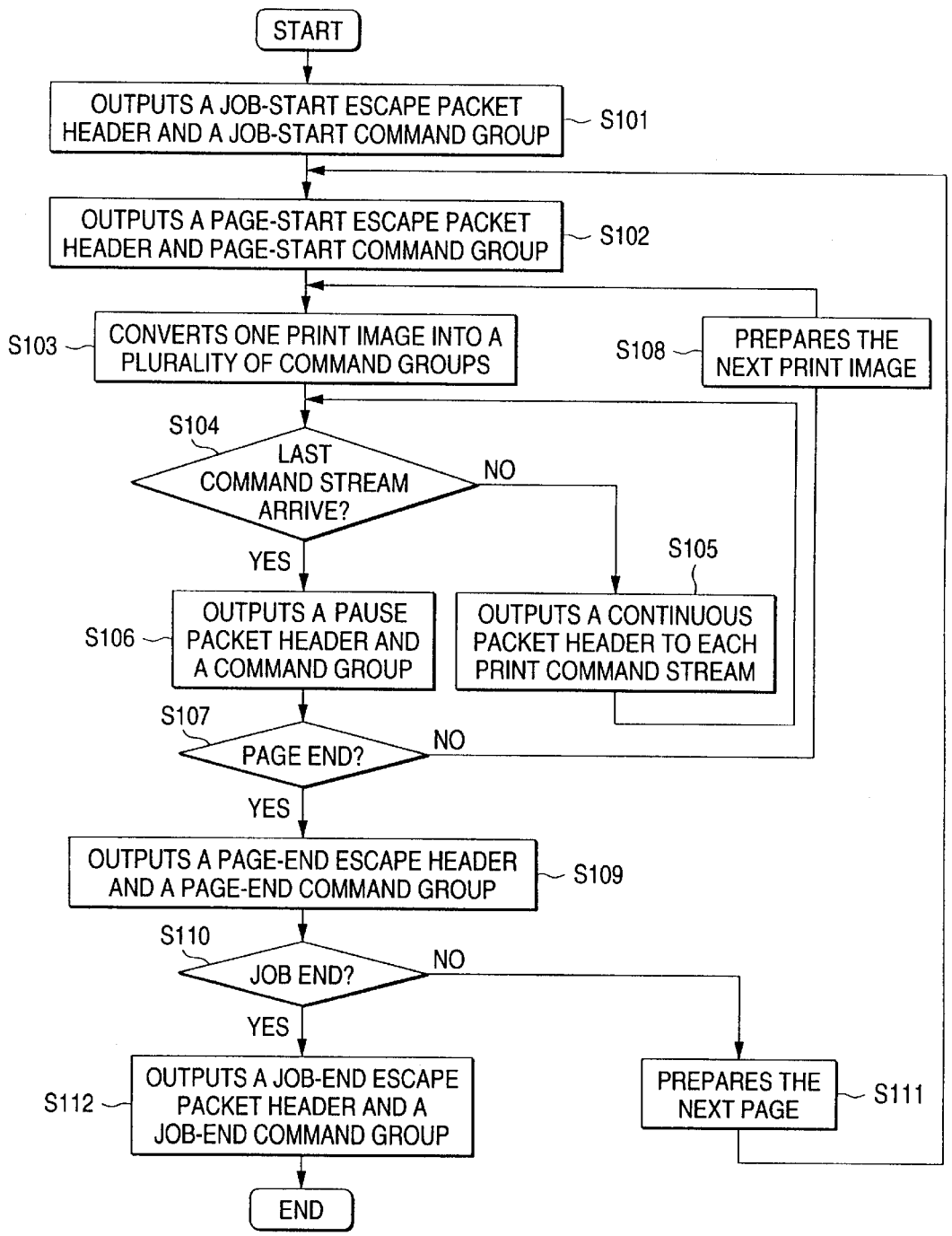
FIG. 3 is a flow chart showing a process procedure executed by a print processing section in the print control system.

A process procedure by the print processing section 12 will be described with reference to FIG. 3. The print processing section 12 sends the headers and the command streams or command groups to the command file section 13 in the following procedure. The print processing section 12 receives a print job, and outputs a job-start escape packet header and a job-start command group (step S101), and then a page-start escape packet header and page-start command group (step S102); it converts one print image into a plurality of command groups (step S103); adds a continuous packet header to each print command stream (Step S104; NO, S105); outputs a pause packet header and a command group when the last command stream of the print image arrives (step S104; YES, S106); returns to the step S103 after the next print image is prepared when the page does not end (step S107; NO, S108); and it outputs a page-end escape header and a page-end command group when the page ends (step S109).

When the job does not yet end, the print processing section 12 prepares the next page, and returns to the process of the step S102 (step S110; NO, step 111). When the job ends, it outputs a job-end escape packet header and a job-end command group, and ends the processing (step S110; YES, S112).

While the print processing section 12 executes the process mentioned above, the command transmitting section 14 reads out, upon occasion, the packet headers, the command streams, and the command groups from the command file section 13, and executes a process in accordance with the contents of the header.

Figure 4:
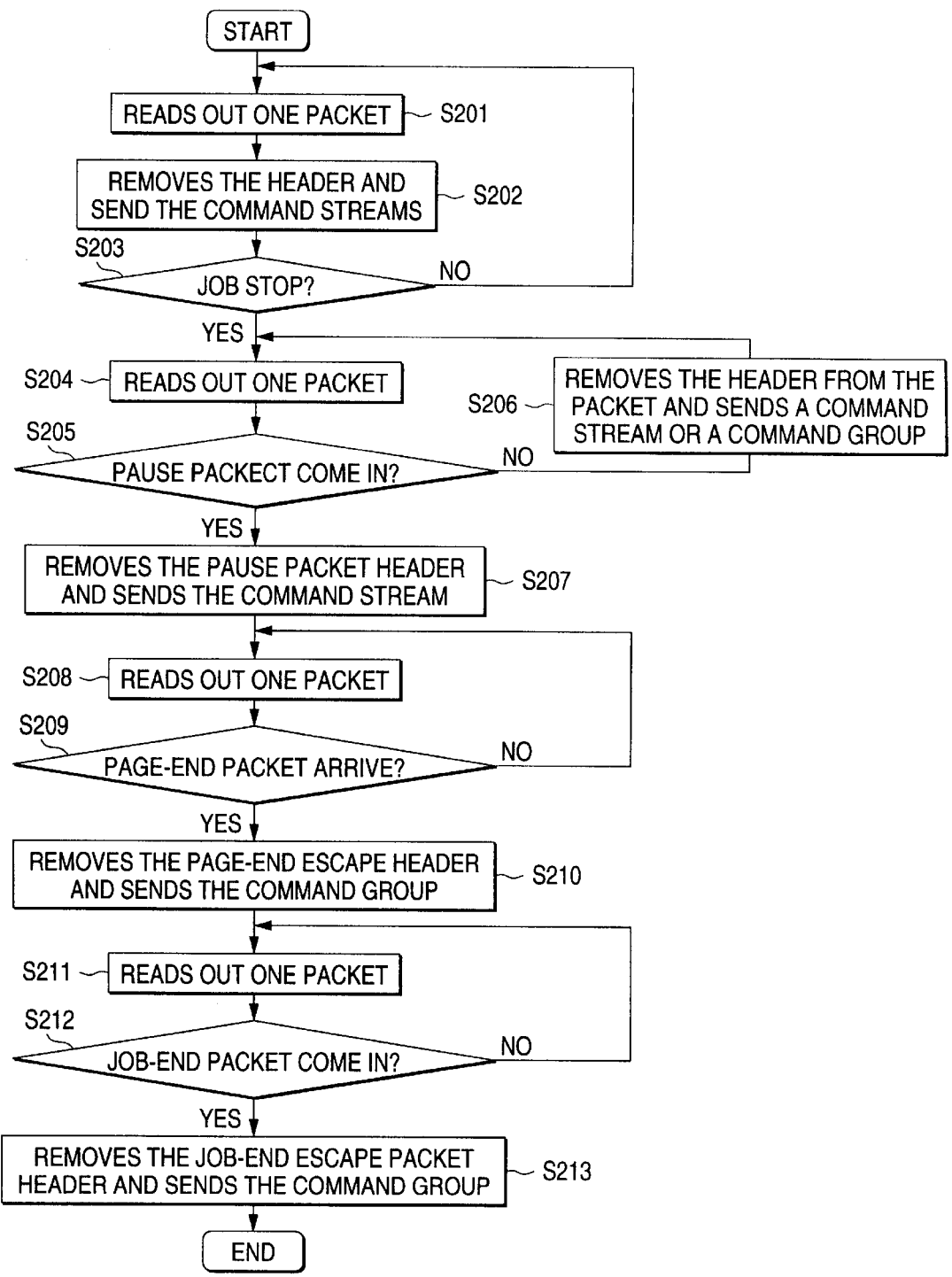
FIG. 4 is a flow chart showing a process procedure executed by a command transmitting section in the print control system.

A process procedure executed when the print management section 11 receives a print interrupt command job interrupt) will be described. FIG. 4 shows an explanatory diagram for explaining a process procedure executed by the command transmitting section 14.

The command transmitting section 14 repeatedly executes a process to read out packets one by one from the command file section 13, to delete the headers and send the command streams till it receives a job interrupt command (step S20 to S203; NO). When receiving a job interrupt command, the command transmitting section 14 reads out packets one by one till a pause packet comes in, and deletes the header from the packet and sends a command stream or a command group to the printing device (step S203; YES, S204 to S206).

When a pause packet comes in, it deletes the pause packet header from the packet and sends the command stream to the printing device (step S207).

Thereafter, it reads out packets one by one till a page-end packet arrives (steps S208 and S209; NO). When receiving a page-end packet, it deletes the page-end escape header from the packet and sends the command group (step S210). Further, it continues its one-by-one packet reading operation till a job-end packet comes in (steps S211 and S212; NO). When the packet comes in, it deletes the job-end escape packet header from the packet and sends the command group to the printing device, and ends the execution of the process (step S212; YES, S213).

Thus, to interrupt the printing operation, for the pause packet, the command transmitting section 14 performs a normal command sending process till the sending of the command stream ends, and subsequent to the pause command, it sends only the command groups of the page-end packet and the job-end packet to the printing device.

A process procedure by the command transmitting section 14 when the print control device is in a high speed copy mode will be described with reference to FIGS. 5 and 6.

Figure 5:
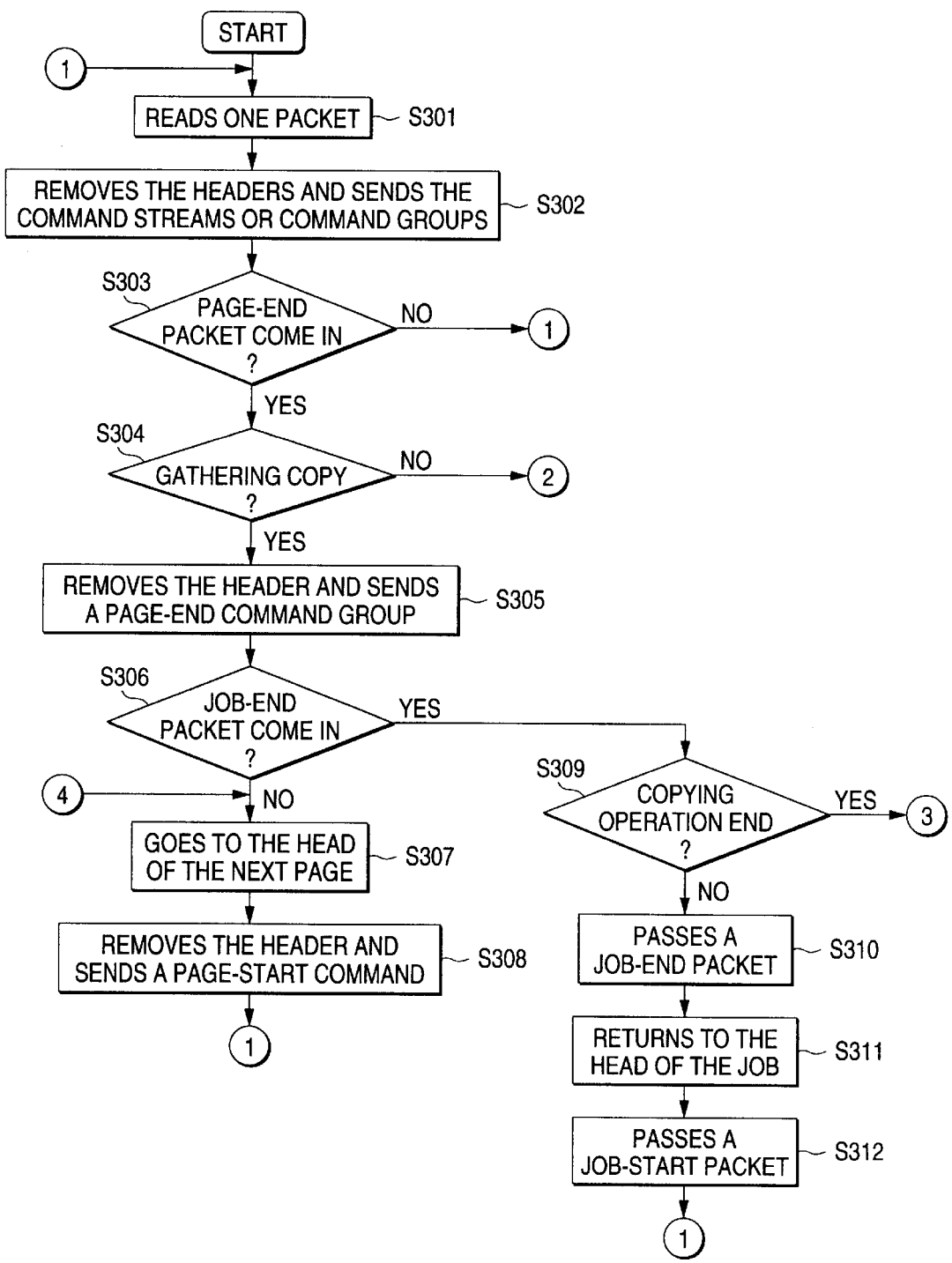
FIG. 5 is a flow chart showing another process procedure by the command transmitting section (in a high speed copy mode)

In FIG. 5, the command transmitting section 14 repeatedly executes a process to read out packets one by one from the command file section 13, to delete the headers and send the command streams or command groups to the printing device 2 till it receives a page-end packet (steps S301 to S303; YES). When a page-end packet comes in, the command transmitting section 14 determines if a gathering copy mode needs to be performed. Here, the gathering copy mode" means the following copy mode: to form two sets of copies each consisting of, for example, three pages, the printing device 2 copies original documents of first to third pages, and performs the same copying operation again.

When the gathering copy mode needs to be performed, the command transmitting section 14 deletes the header, and sends a page-end command group to the printing device (step S305). Then, the processing by the command transmitting section goes to the head of the next page, the command transmitting section deletes the header and sends a page-start command group to the printing device, and returns to the step S301 (steps S306 to S308). This process is repeated till a job-end packet comes in (step S306; NO).

When a job-end packet arrives, the command transmitting section determines whether or not the gathering copy mode ends (step S309). When that copy mode does not yet end, it passes a job-end packet and returns to the head of the job, and passes a job-start packet and returns to the step S301 (steps S310 to S312).

Figure 6:
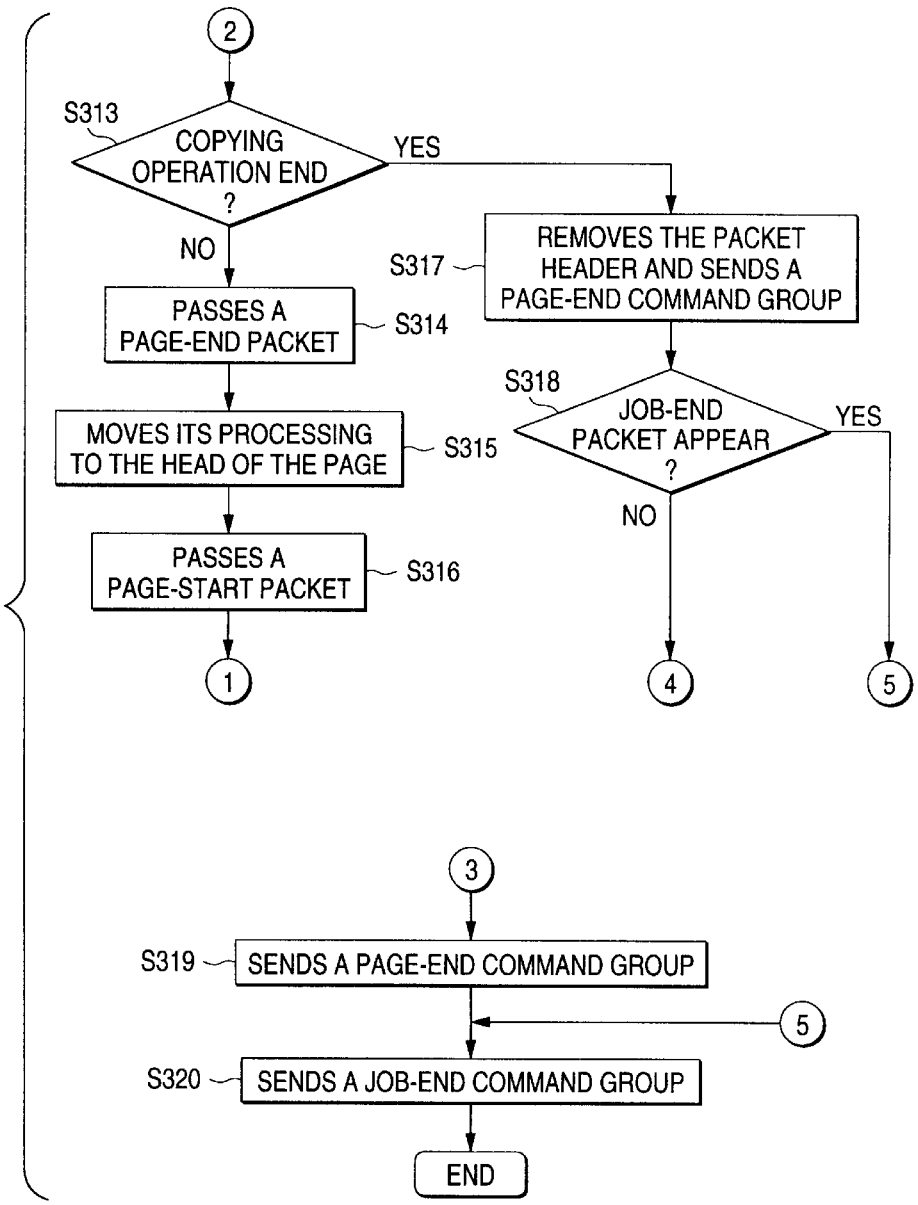
FIG. 6 is a flow chart continued from the flow chart of FIG. 5.

In the step S304, when the copy mode is not the gathering copy mode, the command transmitting section determines that the copy mode is a normal copy mode, and advances to a process illustrated in the upper portion in FIG. 6. The "normal copy mode" means the following copy mode: to form two sets of copies, the printing device copies original documents of three pages in the order of 1 (page number), 1, 2, 2, 3, and 3. When the copying operation does not yet end, it passes a page-end packet, moves its processing to the head of the page, and passes a page-start packet, and returns to the step S301 (steps S314 to S316). When the copying operation ends, it deletes the header, sends a page-end command group to the printing device, and advances to a step S307 (step S313; YES, S317. S318; NO).

When the gathering copy mode ends (step S309; YES), the command transmitting section deletes the header and sends a page-end command group to the printing device (step S319). When this process ends or when a job-end packet comes in the step S318, it deletes the header from the packet and sends a job-end command group to the printing device, and ends its execution of the sequence of process steps (step S320).

As described above, in the case of the copying process, there is no need of sending the command stream every page. Because of this, the process for producing a plural number of copies of the same page is carried out at high speed.

The details of the process contents are shown in FIG. 7. The "data contents" in FIG. 7 indicates the contents of the command file section 13 formed through the processing by the print processing section 12. In this instance, the packet header or the packet escape header is expressed by using two bytes. The packet header indicates the interrupt (of the subsequent processing of the print commands) permission or rejection and the packet size of a command stream of each packet, and the packet escape header indicates the start and end of a sequence of print process steps.

In "1xxxxxxx xxxxxxxx", x="0x0001~0xfff", and indicates the packet size or that this header is followed by a command stream of x bytes. "1" of the header indicates that the interrupt of the processing is permitted to may be interrupted after the sending of the command stream is completed. "0" of "0xxxxxxx xxxxxxxx" indicates that the interrupt of the processing is to be rejected after the sending of the command stream is completed.

"00000000 00000000"=packet escape header. The header includes an end sequence position of two byte in its trailing portion. In this header, "00000000 00000001" indicates the start of a job-end sequence; "00000000 00000010", the end of the same; and "00000000 00000011", the end of a page-end sequence.

Let it be supposed that a print interrupt command occurs at a time point (1). In this instance, the start of the packet header is "0". Accordingly, the command transmitting section 14 continues the sending of a x-byte command. At the next time point (2), the head of the packet header is "1". Then, the command transmitting section interrupts the command sending after the sending is completed, and passes incoming packets till a page end sequence appears. When it finds the start of the page end sequence (at a time point (3)), and continues the command sending till the end of the page end sequence appears (at a time point (4)). Subsequent to the time point (4), it ignores the page end sequence since it has completed the sending of the sequence. Specifically, even if the subsequent page end sequence appears, it passes the sequence. When it finds the start of the job-end sequence (at a time point (5)), it continues the command sending till the end of the sequence is reached.

In this way, the command transmitting section sends the commands indispensable for the process execution to the printing device, and passes the commands not always necessary for the printing device. As a result, an efficient print control is realized.

When those functions are incorporated into the control of the printing device connected to a network, the printing operation can be quickly interrupted on the network. It is believed that this is very useful in practical use.

In the above-mentioned embodiment, the print commands are converted into the form of a packet, and the header is attached to the packet. The present invention may also be implemented such that the print processing section 12 attaches various types of indicating information to the packet, and the command transmitting section 14 interprets the indicating information and carries Out necessary processes.

The above-mentioned embodiment uses one print control device 10 for realizing a print control system. If required, a plurality of print control devices may be used for the same purpose.

Figure 8:
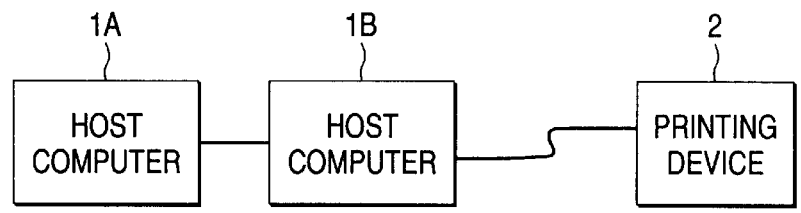
FIG. 8 is a block diagram showing an arrangement of another print system which is another embodiment of the invention.
Figure 9:
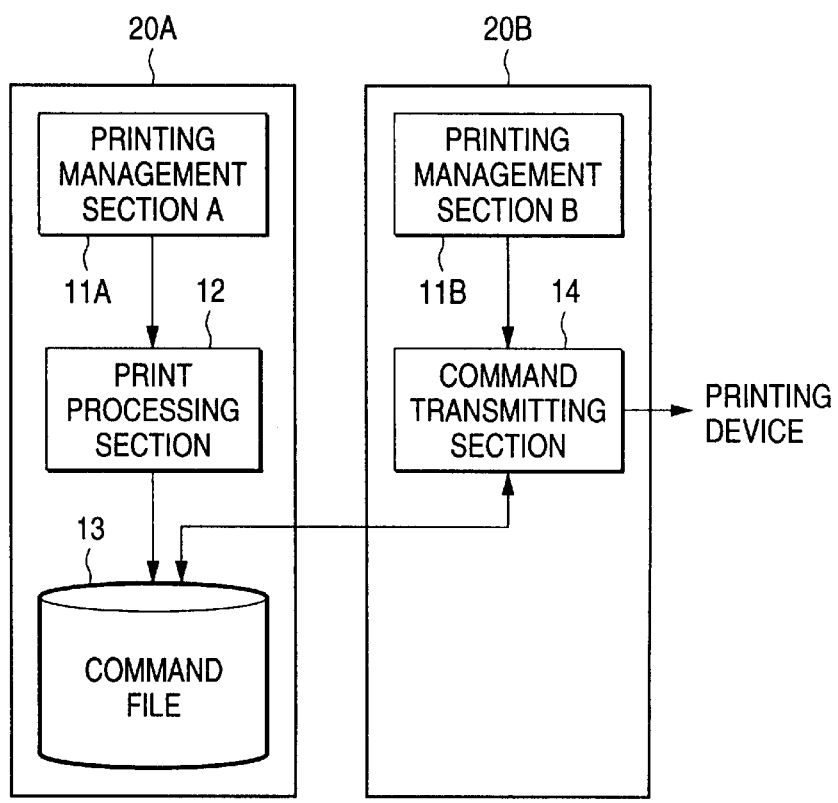
FIG. 9 is a block diagram showing an arrangement of a key portion of the FIG. 8 print system.
Figure 10:
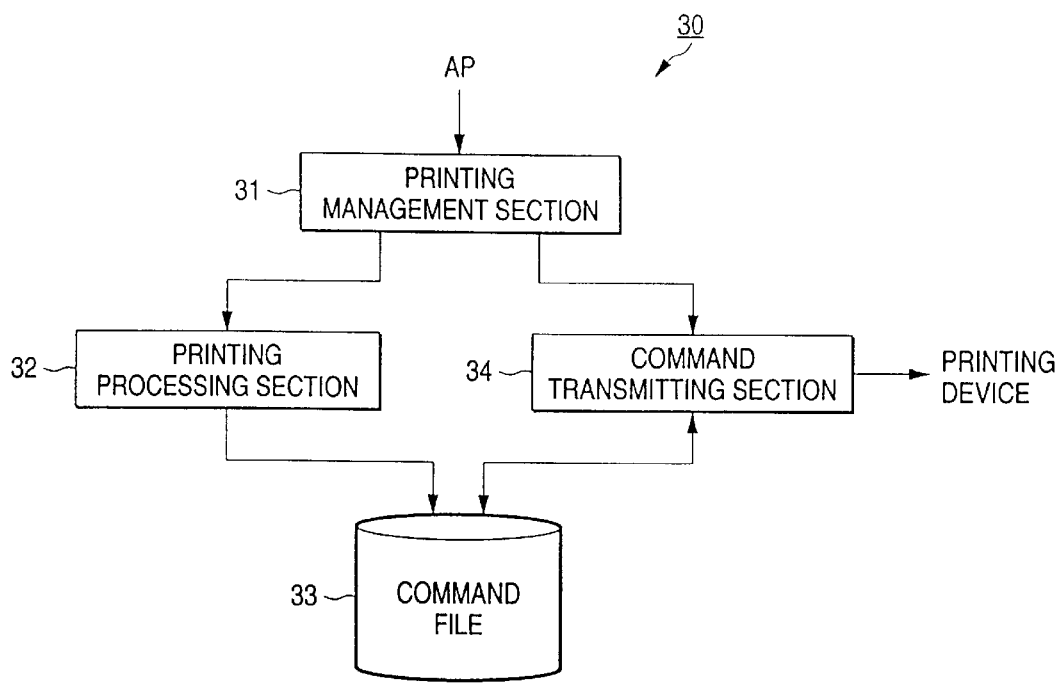
FIG. 10 is a block diagram showing an arrangement of a conventional print control device.

An example where the plurality of print control devices is shown in FIG. 8. In the example, two print control devices are used. As shown, two host computers 1A and 1B are incorporated into a network. In this system, the host computer 1A is used as an application server, and the host computer 1B as a print server. As shown in FIG. 9, print control devices 20A and 20B, while being cooperatively operable, are installed into the host computers 1A and 1B, respectively. The print control device 20A includes a print management section 11A, a print processing section 12 and a command file section 13. The print control device 20B includes a print management section 11B and a command transmitting section 14. The print management sections 11A and 11B cooperate to exercise substantially the same function as of the print management section 11 in the above-mentioned embodiment.

In the print control system thus arranged, a print interrupt may be instructed in the print server (host computer 1B), which is separate from the application server (host computer 1A). Specifically, the print management section 11B recognizes a print interrupt instruction, and sends it to the command transmitting section 14. The print control device 20B may also be realized by use of a router on the network or a network board contained in the printing device 2.

As seen from the foregoing description, the present invention successfully solves the problems that arise when a process for print data generation, print command issuance and another process for print command transmission are concurrently carried out, and hence realizes an efficient print control.

What is claimed is:

1. A print control method for converting print data into print commands having a predetermined format and storing the print commands, while simultaneously sequentially reading the stored print commands and sending the read print commands to a printing device,
   wherein each of the print commands has indicating information attached thereto, the indicating information for indicating whether or not a subsequent processing may be interrupted, and interpreting the indicating information before each of the read print commands is sent to the printing device to thereby determine whether or not the subsequent processing may be interrupted.

2. A print control method for converting print data into print commands having a predetermined format and storing the print commands, while simultaneously sequentially reading the stored print commands and sending the read print commands to a printing device,
   wherein the print commands are formed into groups and each of the print commands has indicating information attached thereto, the indicating information for indicating print positions corresponding to the groups, and skipping the print commands before each of the read print commands is sent to the printing device until the indicating information indicating a specified print position is interpreted.

3. A print control method for converting print data into print commands having a predetermined format and storing the print commands, while simultaneously sequentially reading the stored print commands and sending the read print commands to a printing device,
   wherein the print commands are formed into groups and each of the print commands has indicating information attached thereto, the indicating information for indicating at least one of whether a subsequent processing may be interrupted and print positions corresponding to the groups; the print control method comprising receiving a print interrupt instruction, and, in case of receiving the print interrupt instruction, interpreting the indicating information to determine whether or not the subsequent processing of the groups may be interrupted and skipping the print commands until the indicating information indicating a specified print position is interpreted, both of which steps are performed before each of the read print commands is sent to the printing device.

4. A print control system for converting print data into print commands having a predetermined format and storing the print commands, while simultaneously sequentially reading the stored print commands and sending the read print commands to a printing device, comprising:
   attaching means for attaching indicating information to each of the print commands for indicating whether or not a subsequent processing may be interrupted; and
   interpreting means for interpreting the indicating information before each of the read print commands is sent to the printing device to thereby determine whether or not the subsequent processing may be interrupted.

5. A print control system for converting print data into print commands having a predetermined format and storing the print commands, while simultaneously sequentially reading the stored print commands and sending the read print commands to a printing device, comprising:
   attaching means for attaching indicating information to the print commands which are formed into groups wherein the indicating information indicates print positions corresponding to the groups; and
   skipping means for skipping the print commands before each of the read print commands is sent to the printing device until the indicating information indicating a specified print position is interpreted.

6. A print control system for converting print data into print commands having a predetermined format and storing the print commands, while simultaneously sequentially reading the stored print commands and sending the read print commands to a printing device, comprising:
   attaching means for attaching indicating information to the print commands which are formed into groups wherein the indicating information indicates at least one of whether a subsequent processing may be interrupted and print positions corresponding to the groups;
   receiving means for receiving a print interrupt instruction;
   interpreting means for interpreting the indicating information before each of the read print commands is sent to the printing device to thereby determine whether or not the subsequent processing may be interrupted in case of receiving the print interrupt instruction; and
   skipping means for skipping the print commands before each of the read print commands is sent to the printing device until the indicating information indicating a specified print position is interpreted in case of receiving the print interrupt instruction.

7. A recording medium, accessible by a computer, which stores a program for causing the computer to execute:
   a process for converting print data into print commands having a predetermined format;
   a process for attaching indicating information to each of the print commands for indicating whether or not a subsequent processing may be interrupted, and storing the print commands with the indication information attached thereto;

a process for interpreting the indicating information to thereby determine whether or not the subsequent processing may be interrupted; and a process for sending only the print commands, being determined to be sent by interpreting said indicating information, to a printing device.

8. A recording medium, accessible by a computer, which stores a program for causing the computer to execute:

a process for converting print data into print commands having a predetermined format;

a process for forming the print commands into groups;

a process for attaching indicating information to each of the print commands for indicating print positions corresponding to the groups, and storing the print commands with the indication information attached thereto;

a process for skipping the print commands until the indicating information indicating a specified print position is interpreted; and a process for sending predetermined print commands to a printing device when the indicating information indicating a specified print position is interpreted.

9. A recording medium, accessible by a computer, which stores a program for causing the computer to execute:

a process for converting print data into print commands having a predetermined format;

a process for forming the print commands into groups;

a process for attaching indicating information to each of the print commands for indicating at least one of whether a subsequent processing may be interrupted and print positions corresponding to the groups, and storing the print commands with the indication information attached thereto;

a process for receiving a print interrupt instruction;

a process for interpreting the indicating information to determine whether or not the subsequent processing of the groups may be interrupted and skipping the print commands until the indicating information indicating a specified print position is interpreted in case of receiving the print interrupt instruction; and a process for sending predetermined print commands to a printing device when the indicating information indicating a specified print position is interpreted.

10. A recording medium according to any of claims 7 to 9, wherein the indicating information is deleted before the print commands are sent to the printing device.

11. A recording medium according to any of claims 8 or 9, wherein the group of print commands corresponds to a unit of print processing.

12. A recording medium according to claim 11, wherein the unit of print processing corresponds to any of a command stream, page, or a job.

13. A recording medium according to any of claims 7–9 or 12, wherein the indicating information has a format not affecting the printing device.

14. A recording medium according to any of claims 7 to 9, wherein the indicating information is deleted before the print commands are sent to the printing device and has a format not affecting the printing device.

15. A recording medium according to any of claims 8 or 9, wherein the group of print commands corresponds to the unit of print processing and the indicating information has a format not affecting the printing device.

* * * * *